(No Model.) 2 Sheets—Sheet 1.

T. S. MARSHALL.
RICE HARVESTER.

No. 362,026. Patented Apr. 26, 1887.

Witnesses:
D. J. Decker
E. J. Mockford

Inventor:
Thomas S. Marshall
By G. W. Ford Atty.

N. PETERS, Photo-Lithographer, Washington, D. C.

(No Model.) 2 Sheets—Sheet 2.

T. S. MARSHALL.
RICE HARVESTER.

No. 362,026. Patented Apr. 26, 1887.

Witnesses:
P. J. Becker
E. J. Mockford

Inventor.
Thomas S. Marshall
By G. W. Ford Atty.

N. PETERS. Photo-Lithographer. Washington, D. C.

UNITED STATES PATENT OFFICE.

THOMAS S. MARSHALL, OF BATAVIA, NEW YORK, ASSIGNOR TO THE JOHNSTON HARVESTER COMPANY, OF SAME PLACE.

RICE-HARVESTER.

SPECIFICATION forming part of Letters Patent No. 362,026, dated April 26, 1887.

Application filed October 11, 1886. Serial No. 215,950. (No model.)

*To all whom it may concern:*

Be it known that I, THOMAS S. MARSHALL, a citizen of Great Britain, residing at Batavia, in the county of Genesee and State of New York, have invented a new and useful Rice-Harvesting Machine, of which the following is a specification.

My invention relates to improvements in grain-harvesting machines in which is used a canvas raking-belt made to travel across the platform of the machine in the rear of the finger-bar, and upon which the cut-grain falls and is thereby carried to a circularly-running canvas, and by means of which the stalks of grain are given a quarter-turn before they are deposited upon the ground; and the object of my improvement is to provide a machine adapted more especially for use in harvesting rice, yet available for use in connection with some of the well-known types of grain-binders.

Before proceeding to describe the machine in detail, it may be well to state that, for the successful curing of rice after cutting, the grain-bearing stalks should be spread evenly upon the stubble and above the wet ground, so common where this cereal is cultivated, and there remain, subject to the action of the sun, for a sufficient length of time for a proper hardening of the berry.

It is well known that rice is grown upon low land that is capable of being flooded with water, the seed planted in drills, with some little space between the rows. When the grain is cut, the stalks are laid across these open spaces and upon the stubble ends of at least two rows, so that the heads of grain may be held clear of the wet ground. To automatically place this grain in the position above noted, it is necessary that the cutting be done by the machine moving in the line of the row's length; also, that after the cutting a quarter-turn be given the severed grain, so that the same may be deposited in thin layers upon the stubble out of the way of the team in the succeeding round.

I attain this object by the mechanism illustrated in the accompanying drawings, in which—

Figure 1:
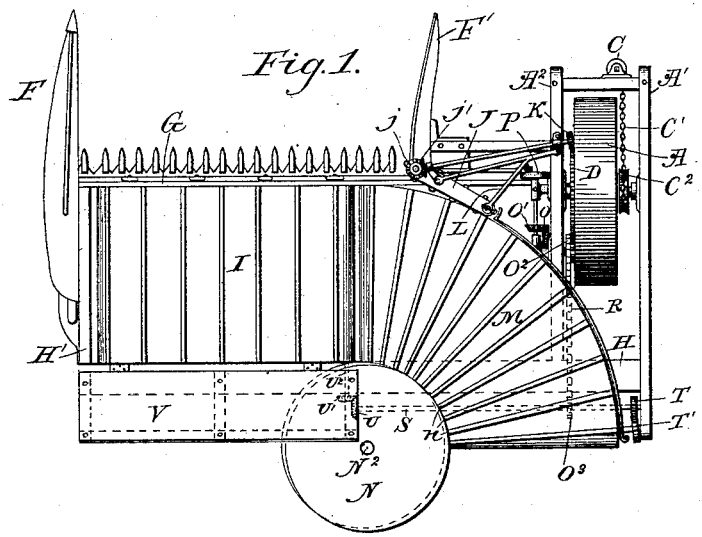
Figure 2:
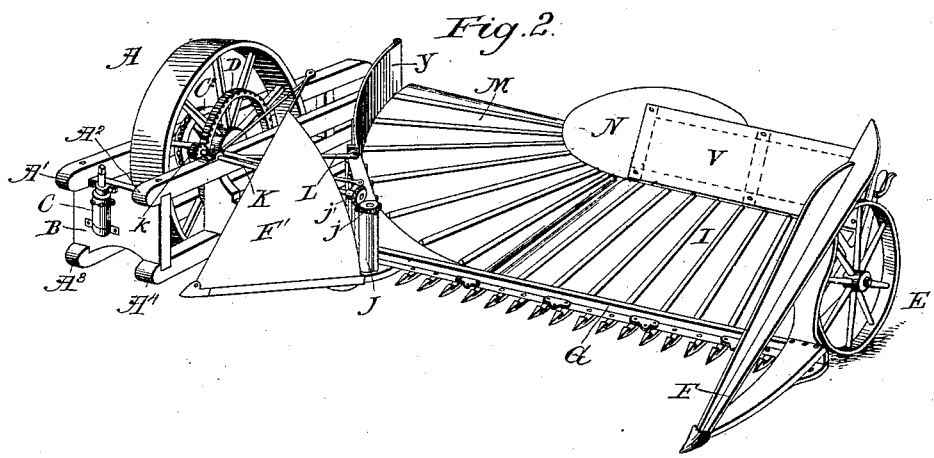
Figure 3:
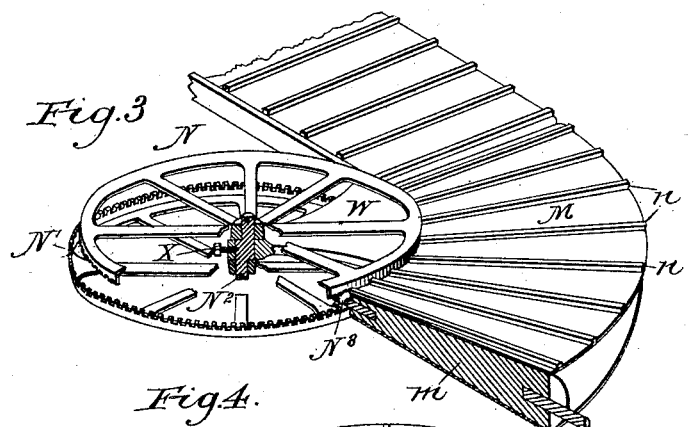
Figure 4:
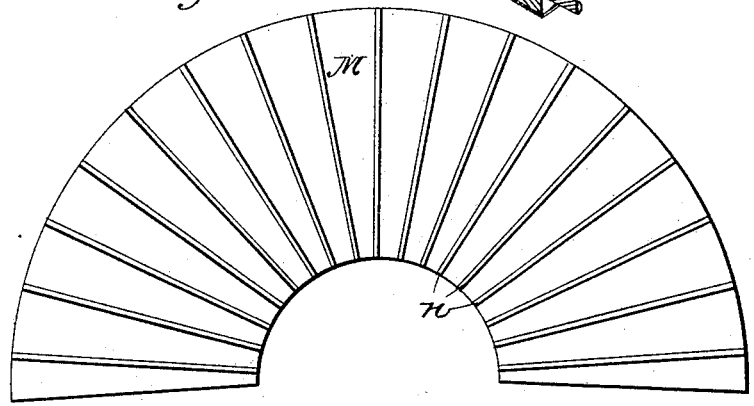
Figure 5:
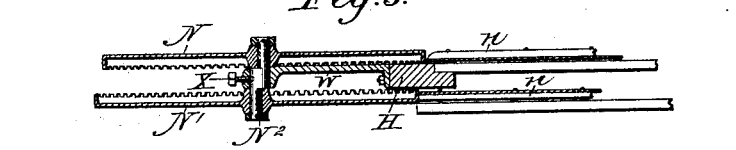
Figure 6:
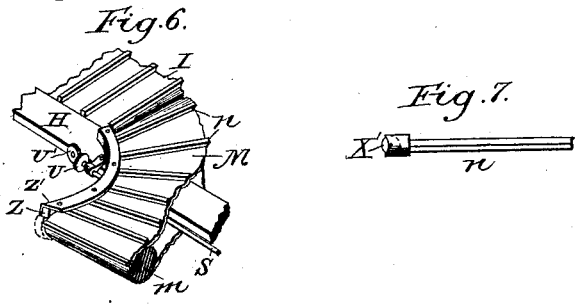
Figure 7:
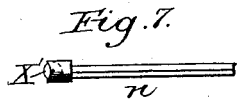

Figure 1 is a plan view of so much of a harvester as is necessary to show the invention. Fig. 2 is a perspective view taken from the front. Fig. 3 is a sectional view of the circular canvas, with retaining-wheels; and Fig. 4 is a view of the circular canvas before the same is doubled around its propelling-rollers. Figs. 5, 6, and 7 are detail views.

Similar letters refer to similar parts throughout the several views.

A represents the driving-wheel; $A'$ $A^2$, the upper longitudinal beams of the wheel-supporting frame, and $A^3$ $A^4$ the lower beams of the same.

B is the cross-bar uniting the longitudinal beams and forming the front portion of the wheel-frame, while the rear end of the said frame may be similarly or otherwise united.

C is a vertical roller, attached by suitable bearings to the cross-bar B, and having the upper end of its journal squared for the purpose of attaching a removable crank-arm, by which, through the intervention of the hoisting-chain $C'$, attached to the sheave $C^2$ upon the driving-wheel arbor, the stubble end of the machine can be raised and lowered in the usual and well-known manner common to grain-binders.

D is the gear-wheel secured to the drive-wheel, and by which the operating mechanism is propelled.

E is the grain-wheel, having the usual raising and lowering lever, which in this instance is unnecessary to describe. The divider F and gatherer $F'$ are of the usual well-known type, as well as the finger-bar G, carrying the common vibrating sickle driven by the pitman, and as commonly found in grain-harvesters.

H is a beam in the rear of and extending parallel with the finger-bar, one end of which is secured to the drive-wheel frame at the back end of the same, while the other end is united to the cross-beam $H'$ upon the grain end of the machine, which, in connection with the finger-bar, forms a rectangular frame, within which the platform-apron I is made to move.

J represents the usual revolving canvas grain-butter, which is made to operate through the intervention of the bevel-wheel $j$, attached to the forward roller of the butter, the said wheel meshing into a corresponding wheel, $j'$, upon the end of the shaft K, the reverse end of said shaft carrying the pinion $k$, which meshes into the gear-wheel D.

L is a forked brace-rod, the bifurcated parts of which are secured to the upper portion of the butter-frame, while the single end is fastened to the beam A², and by means of which the butter-frame is firmly held in working position.

M is a circular revolving canvas driven by tapering rollers m, the larger end being placed outwardly. This circular canvas has stiffening ribs n upon the face side, diverging from the center outwardly.

N N' are wheels, each having a right-angled inwardly-projecting peripheral flange, against which flange, upon the face thereof, the inner ends of the ribs n abut, which, as the circular canvas in turning tends to the center, causes the wheels and canvas by frictional contact to travel together when the same are lightly loaded with grain. To obviate a difficulty which under certain conditions of the grain may occur, I have provided these flanges with gear-teeth n', which extend inwardly beyond the ribs, said teeth meshing into and being driven by a pinion, N³, which is secured to the inwardly-extending journal of the rear tapering roller, which operates the circular canvas, thus causing the canvas and wheels to at all times travel in unison, as the entire mechanism is driven by a single gear-wheel secured to the stubble end of the machine.

If desired, in place of the wheels N N', segments Z may be permanently secured upon either side of the beam H, (see Fig. 6,) thereby retaining the canvas in axial position. To prevent vertical displacement of the canvas, guides Z' are secured to the segments upon the face side, and reaching inwardly and over the ends of the ribs sufficiently far to at all times keep the canvas and segments in true working position.

To prevent undue wear of the parts, anti-friction rollers X' may be interposed between the segments and canvas ribs, yet this may be objectionable on account of complication and the liability of the rollers becoming clogged by straws or other extraneous matter. (For illustration of roller see Fig. 7.)

Returning, now, to the operating mechanism, O is a bevel-wheel mounted upon a cross-shaft, and having power communicated thereunto through the medium of a pinion which meshes into the main driving-gear D.

O' is still another pinion meshing into pinion O, mounted upon a shaft provided with suitable bearings and turning within the same, while the shaft also carries the crank-head P, for imparting motion to the sickle through the ordinary pitman-connection. Upon the shaft bearing the wheel O is mounted a sprocket-wheel, O², said wheel carrying a chain (designated R) by which, through the medium of a corresponding sprocket-wheel, O³, the shaft S is driven. Upon the outer end of shaft S is mounted a gear-wheel, T, which meshes into gear-wheel T', secured to the journal, forming a bearing for the tapering roller m, and by means of which the circular canvas M is driven. To the inner end of the shaft S is secured a miter-pinion, U, which meshes into a corresponding pinion, U', upon the end of the journal U², forming one bearing of a roller which carries the horizontal canvas I, and whereby the same is driven.

V is a rear grain-shield, hinged or otherwise secured to the beam H at a point back of the platform-canvas, the rear edge of which may be raised or lowered upon its hinge thereby preventing the stalks of grain from sliding backward in the progressive movement of the machine, as well as retarding the head end of the grain-stalks and assisting in turning the same.

W is a bearing-bracket, secured at its front end to the beam H, while the rear end extends back sufficiently far to support the journal N², upon either end of which the wheels N N' turn. This bracket W also forms a support for the several shaft-bearings incidental to the roller-driving mechanism, the journals of which center at this point.

X is a set-screw for fastening the axle N² in the desired relative position of the said axle with the bracket.

Y is a curved shield, rising up sufficiently far to even the butts of grain while the same are being carried rearward by the canvas forming a segment of a circle, and by which a quarter-turn is given the stalks anterior to the time they are dropped from the machine. When the grain is in good condition, the butter may be dispensed with by having the inner end of the shield brought around in close proximity with the finger-bar; but I prefer using the butter, as that insures the proper delivery of the grain even under unfavorable conditions.

The object of the offset in the journal N² will now be explained. It will be readily seen that in the use of the tapering rollers incident to the running of the canvas upon a circle the canvas, from its natural tendency toward the axial center, is liable to suffer a slight lateral displacement as it passes from the upper to the lower side of the roller, or vice versa, thus causing the ribs n to catch upon the rim of the contiguous wheel as the rib end in the revolution of the canvas changes its abutment from one wheel to the other. To remedy this evil, I make an offset in the journal supporting the wheels at the point of its passage through the supporting-bracket, a wheel turning upon either end of the journal, the bracket being interposed between the two wheels, one above the other. By having a direct lateral offset in the journal the rim of one wheel projects beyond the edge of the other wheel and upon opposite sides thereof, the rim of the lower wheel extending beyond the rim of the upper one upon one side, and receding to the same degree upon the other side at the turning-point of the canvas, the lower wheel falling back as the canvas leaves the upper wheel, and vice versa. The relative adjustment of the wheels and canvas is made by turning the offset-journal to the right or left until the desired point of contact of wheels and canvas is reached, and when the adjustment is made the journal is secured in the desired position by the use of the set-screw X.

It will be observed that the circular canvas meets the longitudinal or platform canvas at a point centrally of the finger-bar in the line of its length, with the knife operating in front of a portion of the circular canvas, thus permitting of a reduction in the width of the machine without narrowing the cutting part of the same, so that a wide-cut machine can, without change of parts, and in the forward movement, be drawn through the ordinary gateway.

It will also be seen that in the use of the circular-revolving canvas the grain can be deposited upon the stubble in a thin and continuous swath, with the stalks across the rows of stubble and out of the way of the team in a succeeding round, points essential in the practical operation of a rice-harvesting machine.

I am aware that I am not the first to use a quadrantal canvas belt for turning the cut stalks of grain previous to depositing the same upon the ground; but, as far as I am aware, I am the first to organize a harvesting-machine having a revolving platform-canvas and a quadrantal one both upon the same horizontal plane and driven by a single gear mechanism, so that a uniform rate of speed is maintained in both sections, whereby the grain is given a quarter-turn and symmetrically spread upon the stubble in a thin continous swath without the aid of other devices save the quadrantal canvas alone; consequently I do not broadly claim the use of such canvas for giving the cut grain a quarter-turn; but What I do claim, and desire to secure by Letters Patent, is—

1. The combination of the straight endless traveling canvas, the quadrantal traveling canvas having the radial stiffening-ribs, their inner ends impinging against the circumference of the central abutting device, the traveling grain-butter secured to the harvester-frame at a point between the inner grain-shoe and ground-wheel, said wheel carrying the driving-gear, by which the entire harvesting mechanism is propelled, and the circular grain-shield in the rear of the butter, all arranged substantially as described, and for the purpose set forth.

2. The circular canvas having the radial ribs and canvas-operating mechanism, in combination with the offset journal $N^2$, supporting-bracket W, and wheels N N', for the purpose specified, and substantially as herein set forth.

3. The circular canvas and canvas-driving mechanism, in combination with the center wheels, N N', having gear-teeth upon the inwardly-projecting flanges, and the pinion $N^3$, mounted upon a suitable shaft, the pinion-teeth meshing into the teeth on the center wheels and driving the same in unison with the circular canvas, substantially as described.

THOMAS S. MARSHALL.

Witnesses:
G. W. FORD,
F. S. STEBBINS.